Figure 1:
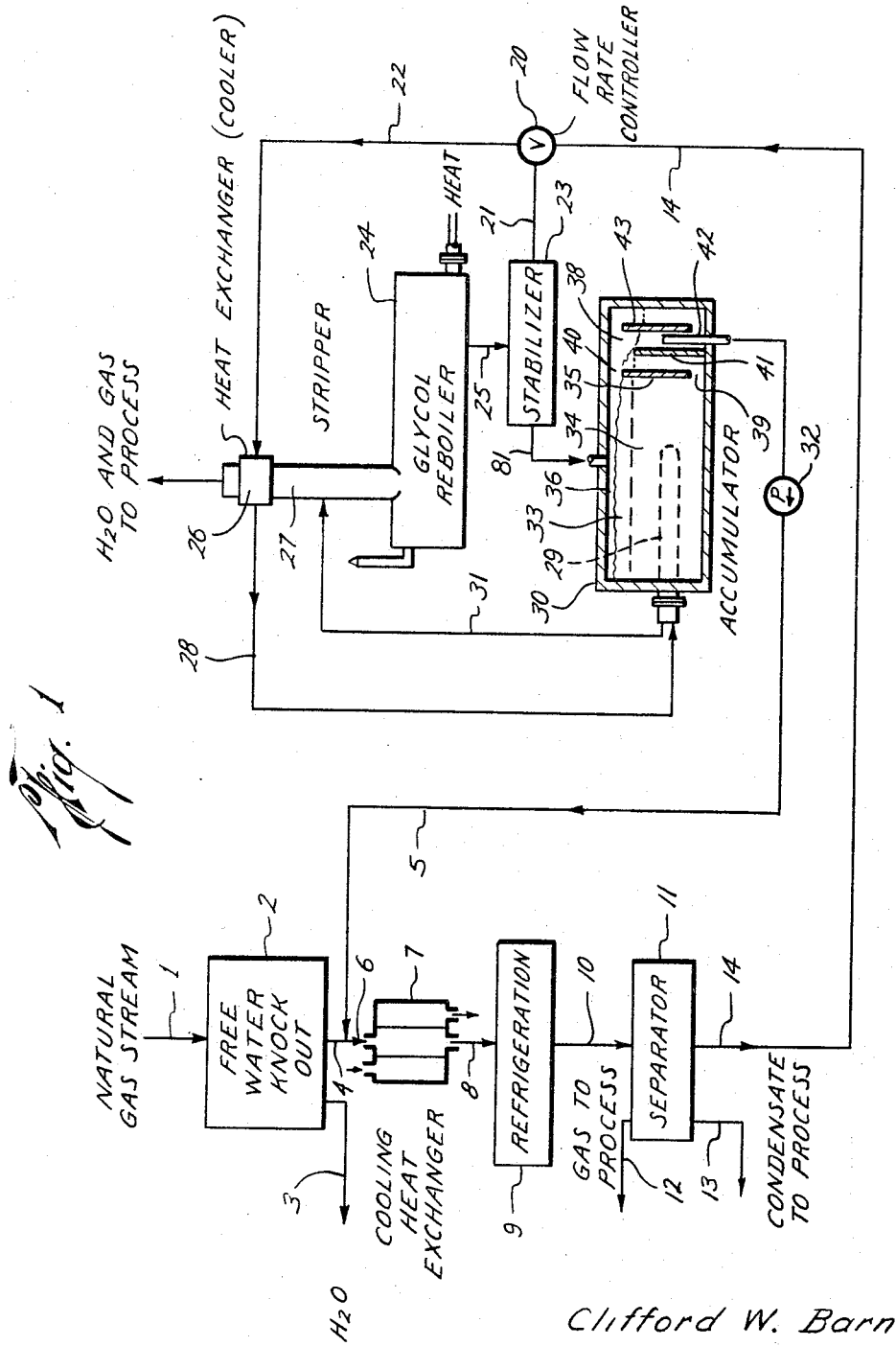

Oct. 17, 1967  C. W. BARNHART  3,347,019
METHOD OF AND APPARATUS FOR DRYING A FLUID STREAM
AND RECONCENTRATING THE ABSORBENT
Filed Nov. 6, 1964  3 Sheets-Sheet 1

Clifford W. Barnhart
INVENTOR.

BY James F. Weiler
Jefferson D. Giller
William L. Stout
Paul L. DeVerter II
ATTORNEYS

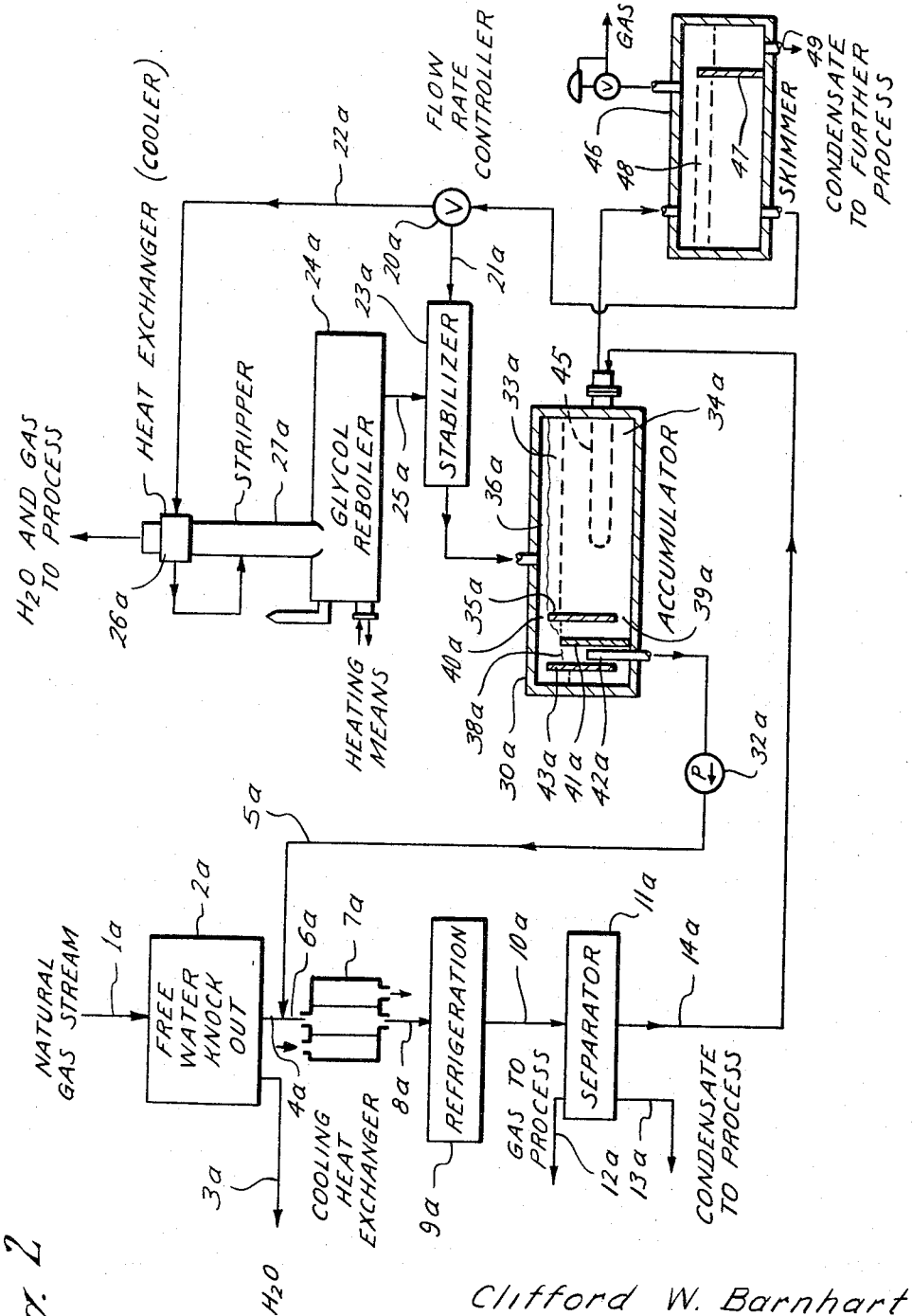

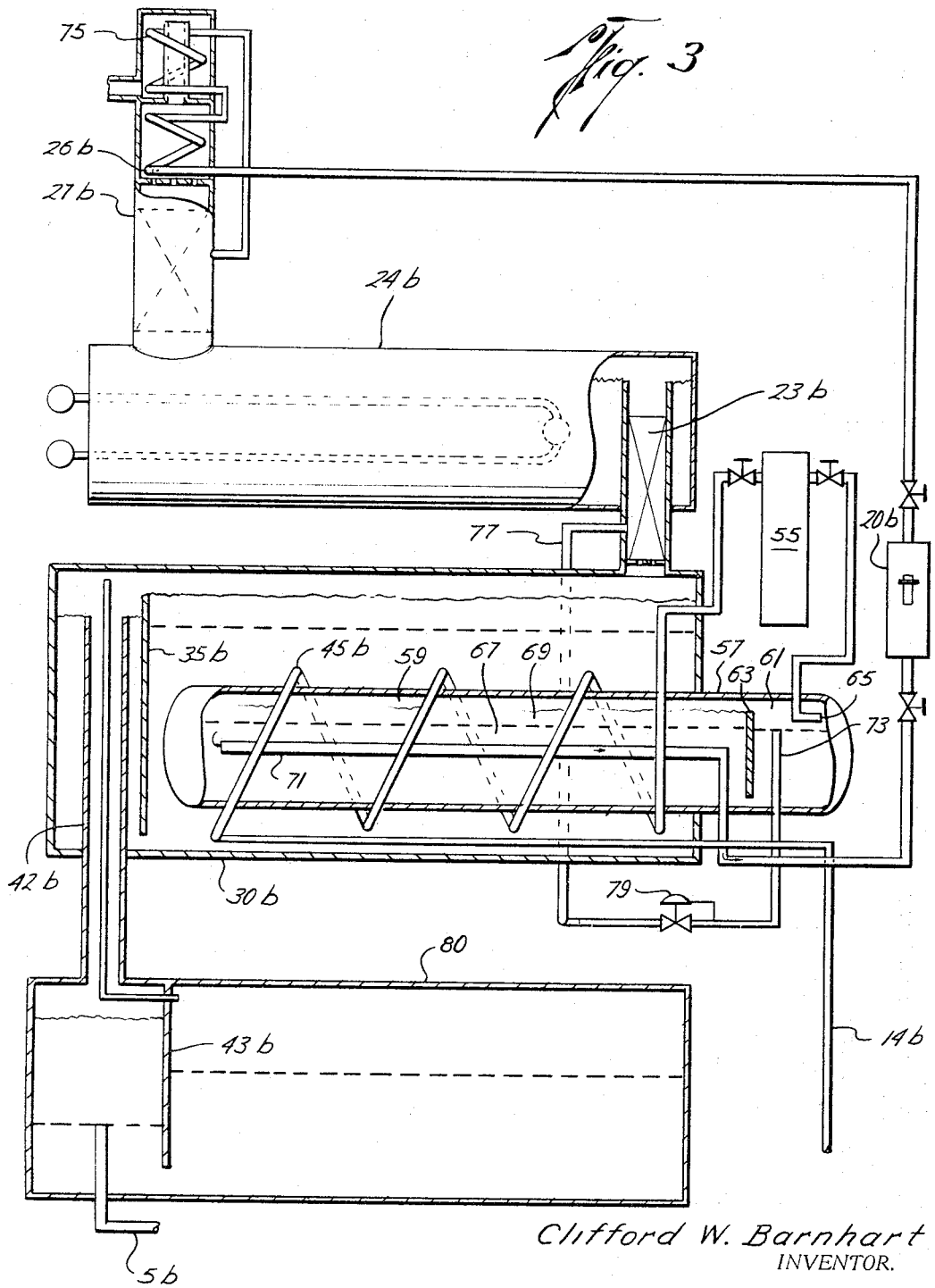

United States Patent Office 3,347,019
Patented Oct. 17, 1967

3,347,019
METHOD OF AND APPARATUS FOR DRYING A FLUID STREAM AND RECONCENTRATING THE ABSORBENT
Clifford W. Barnhart, Tulsa, Okla., assignor to Black, Sivalls & Bryson, Inc., Kansas City, Mo., a corporation of Delaware
Filed Nov. 6, 1964, Ser. No. 409,466
5 Claims. (Cl. 55—32)

The present invention relates to the method of and an apparatus for drying a fluid stream and reconcentrating the absorbent, and more particularly, relates to regenerating the absorbent stream by the removal of a solute so that the liquid absorbent may be recycled. The present process and apparatus is particularly useful in the recovery of liquid hydrocarbons from a natural gas stream when employing refrigeration to the gas stream.

Generally, it is old to inject an absorbent into a process stream composed of a solute and at least one immiscible fluid, for the purpose of absorbing the solute in a way to reduce the ice making or hydrate forming ability of the solute to temperatures below the normally expected formation temperature thereby permitting the whole process to operate at sub-formation temperatures, then recover the solute enriched absorbent and reconcentrate the absorbent for reuse in the process. In the process of natural gas, normally, glycol is the absorbent, water is the solute and hydrocarbon gas and condensate are the immiscible fluids.

The glycol is normally reconcentrated for continuous use by reboiling the glycol-water-condensate stream to partially vaporize the water. However, this conventional method of regenrating the glycol has not been entirely satisfactory because of (1) surge flow from the separator to the glycol regeneration system requires oversizing of the regeneration system, (2) all of the solution of glycol and water is reconcentrated and has a high temperature which must be dissipated and therefore requires additional expensive cooling equipment, and (3) the reconcentrated glycol solution generally includes hydrocarbon condensate which interferes with the normal glycol regeneration process. The present invention is directed to an improved process and apparatus which will overcome the deficiencies of the conventional systems.

A general object of the present invention is the provision of a method of and an apparatus for reconcentrating the liquid absorbent so that the absorbent may be recycled.

A further object of the present invention is the provision of a method of and an apparatus for reconcentrating a relatively cool solution of liquid absorbent and liquid solute by dividing the cool stream of solution into first and second streams, heating only the first stream sufficiently to obtain a highly concentrated absorbent, and combining the hot reconcentrated first stream and the relatively cool diluted second stream to provide an absorbent that is cooler than the hot reconcentrated first stream but is richer in absorbent than the second stream thereby reducing the heating requirements and equipment that would be required to heat the entire solution.

A still further object of the present invention is the provision of a method of and an apparatus for reconcentrating a relatively cool solution of liquid absorbent and liquid solute by dividing the cool solution into first and second portions, heating only the first portion sufficiently to obtain a highly concentrated absorbent, but limiting the volume of the first portion thereby eliminating surges in the first portion whereby the heating requirement necessary is only that required to heat the constant and limited flow of said first portion, and thereafter recombining the hot regenerated first portion and the relatively cool diluted second portion for recycling.

Yet a further object of the present invention is the provision of a method of and an apparatus for reconcentrating an absorbent liquid by heating only one portion of the absorbent solution thereby reducing heating requirements and which results in a treated absorbent liquid at a temperature low enough but at a sufficient concentration to substantially reduce the cooling requirement in the processing of a natural gas stream.

Still a further object of the present invention is the provision of a process and an apparatus for regenerating an absorbent liquid by providing a regeneration system which obviates the necessity of using oversized equipment to dampen out sporadic surges or to process the entire absorbent.

Yet a further object of the present invention is the provision of a process of and an apparatus for reconcentrating a relatively cool stream of solution of liquid absorbent and liquid solute containing a immiscible fluid by separating the immiscible fluid from the solution prior to reconcentrating the liquid absorbent.

A still further object of the present invention is the provision of the method of and apparatus for use of a liquid absorbent in drying a gas having an entrained condensate and solute by contacting the gas with the liquid absorbent thereby assisting in removing the solute, separating the solution of absorbent and solute including some condensate from the gas, dividing the solution in two portions, heating the first portion thereby vaporizing a portion of the solute and reconcentrating the absorbent, recombining the hot reconcentrated first portion with the relatively cool diluted second portion to provide a solution having an absorbent that is cooler than the hot reconcentrated first portion but is richer in absorbent than the second portion and includes condensate, and recycling the recombined solution whereby the absorbent removes solute from the gas and the condensate will be reprocessed.

Yet a further object of the present invention is the provision of a process of and an apparatus for reconcentrating a relatively cool stream of glycol and water also contining hydrocarbon condensates where the glycol is reconcentrated and the water is partially vaporized thereby providing a solution of reconcentrated glycol and hydrocarbon condensate and providing withdrawal of portions of both of the glycol and condensate for recycling.

Yet a further object of the present invention is the provision of a method of and an apparatus for regenerating a solution of glycol and water, preheating the solution, dividing the solution into a first and second portion, boiling the first portion to reconcentrate the glycol by partially boiling off the water, recombining the first portion of hot reconcentrated glycol with the cooler second portion, and passing the recombined first and second portions in a heat exchange relationship with the cool solution at a point priod to dividing the solution.

Still a further object of the present invention is the process of and an apparatus for reconcentrating a relatively cool solution of glycol, water and hydrocarbon condensate by dividing the solution into a first portion consisting primarily of glycol and water and a second consisting of glycol, water and condensate, boiling the first portion to reconcentrate the glycol and recombining the hot reconcentrated glycol with the cooler second portion to flash off the lighter hydrocarbons thereby preventing foaming of the recombined solution.

A still further object of the present invention is the provision of an accumulator having means for simultaneous withdrawal of immiscible fluid as well as an absorbent which may include a surge tank for storage of the absorbent to provide an adequate supply of absorbent at all times.

Yet a still further object of the present invention is the provision of an apparatus for reconcentration of glycol in a cool solution containing glycol, water, and hydrocarbon condensate by providing a heat exchanger to receive the solution, a pressure vessel having two compartments, one of which receives the solution from the heat exchanger, pressure regulating means controlling the flow of glycol, water and condensate from the one compartment and flow rate means limiting the rate of flow of substantially only glycol and water from the second compartment for supplying a constant rate of flow to a glycol reboiler, and in which the reconcentrated glycol is combined with the fluid from the first compartment in a stabilizer to prevent foaming and passes to an accumulator which is in a heat exchange relationship with the heat exchanger and the pressure vessel.

Yet a still further object of the present invention is the provision of a first heat exchanger at the outlet of a reflux stripper for conducting a first portion of a solution of glycol and water in heat exchange with the stripper and a second heat exchanger in series with the first heat exchanger and in a heat exchange relationship with the gas and solute vapors emitted from the reflux stripper.

A still further object of the present invention is the provision of a filter in a glycol regeneration system connected downstream from a preheater whereby the glycol solution is filtered only after being preheated.

Other and further objects, features and advantages will be apparent from the following description of presently preferred embodiments of the invention given for the purpose of disclosure, and taken in conjunction with the accompanying drawings, where like character references designate like parts throughout the several views and where:

FIGURE 1 is a schematic flow diagram of a system to remove condensables from a natural gas stream according to the present invention, and FIGURE 2 is a schematic flow diagram of a modified gas system according to the present invention, and FIGURE 3 is a schematic flow diagram of a preferred glycol regeneration system.

Referring now to the drawings, and particularly to FIGURE 1, the reference numeral 1 refers to a petroleum stream such as a natural gas stream which is to be dried. The stream may contain free water as well as salt water, both of which are removed in knockout vessel 2 and passed through line 3 to prevent fouling of the absorbent liquid. An absorbent liquid such as glycol or other suitable fluid is added to the natural gas stream through line 5, and the combined stream is passed through a cooling heat exchanger 7 and may be further cooled in cooler 9 by refrigeration or by pressure expansion. The cooled stream of glycol and gas enters a separator 11 from line 10, preferably a three phase separator wherein a gas phase is separated through line 12, a liquid hydrocarbon condensate phase is separated through line 13, and the dilute cold glycol containing water and a portion of hydrocarbon condensate is drawn off through line 14 so that the glycol may be regenerated or reconcentrated for recycling in the process. Normally, the solution of glycol and water is boiled in a reboiler to reconcentrate the glycol. This requires that the heating equipment process the entire stream of solution in line 14 through the glycol reboiler. In addition, the regeneration system must be sized to accommodate surge flow from the separator 11. However, the reconcentrated glycol has a high temperature; for example, 140° to 180° F., which must be dissipated either in heat exchange in the cooling heat exchanger 7 or cooler 9 which again requires additional equipment and processing. However, in any glycol regeneration process, it is relatively easy to obtain 90 to 95 percent water free reconcentrated glycol. Since the lean glycol requirement in line 5 is usually 70 to 80 percent, this reduced concentration requirement may be met by utilizing a lower reconcentration temperature in the glycol regeneration process. Nevertheless, this would still require that the entire stream from the separator 11 be processed through the regeneration process where heat is applied to the entire stream and cooling is then applied to the entire stream to cool the concentrated solution.

The present invention is directed to dividing the solution of glycol and water, which may include some entrained condensate, into two streams, 21 and 22, by the flow rate controller 20 and heating only the first portion 22 whereby the size of the heating equipment and its operational requirements result in a considerable savings. Normally, the solution in line 14 consists of a water enriched glycol stream having approximately 65% by weight glycol concentration, 2 to 15% by weight hydrocarbon condensate, and the remainder being water. This solution has a temperature typically ranging, by way of example only, from approximately —10° F. to 30° F. The first portion of the stream in line 22 is passed to a heat exchanger 26 on top of the stripper 27 to cool the rising vapors from the stripper and provide reflux liquid for the stripper column. The still relatively cool first portion 22 then passes through line 28 to a heat exchanger 29 in the accumulator 30 where it is preheated. From the heat exchanger 29 the first stream portion passes to line 31 into the stripper column 27. The first stream portion falls down into the reboiler 24 where it is boiled to remove a portion of the water absorbed from the natural gas stream. Normally, the boiler 24 is operated at a high temperature; for example, from 280 to 290° F. which will highly reconcentrate the glycol well in excess of the 70% requirement. The reconcentrated glycol passes from the reboiler 24 through line 25 and, if desired, to a stabilizer 23. Here the reconcentrated hot first portion is recombined with the cool second portion which flows from the flow rate controller 20 through line 21 and into the stabilizer 23. The recombined solution leaves the stabilizer by flowing through line 81 and into the accumulator 30. By recombining the hot highly concentrated glycol from line 25 with the dilute cold second portion from line 21, the process provides an absorbent that is cooler than the hot regenerated first portion but is richer in absorbent than the second portion. That is, by way of example only, if the solution is divided with 25% of the flow to line 22 and 75% to line 21, the approximate 230° F. 90 to 95% concentrated glycol in line 25 combines with the approximately 65% concentration of glycol in line 21 having a temperature in the range of approximately 0° F., to provide a recombined solution of 80% reconcentrated glycol at approximately 85° F. This recombined solution is sufficiently reconcentrated so as to be recycled to the natural gas stream, but is at a low enough temperature not to require all of the additional cooling equipment of the prior art. And, of course, since only a portion of the total solution in line 14 is reconcentrated, the heating equipment may be sized to accommodate only the first stream portion in line 22.

By way of example only, the present process and apparatus will save approximately five tons of refrigeration per 100 gallons per hour of glycol circulated. This results in a $1,500 capital investment saving per 100 gallon per hour circulation rate. Further, the heat savings are approximately one-half the conventional glycol regeneration system being in the order of 150,000 to 500,000 B.t.u. per hour savings for the usual installation. This results in a heating equipment saving of at least $1,000 per unit plus 4 to 10 cents per hour savings in gas consumption for heat.

As has been previously mentioned, the conventional regeneration circuit also has to be oversized to accommodate surges flowing in the line 14 from the separator 11. However, the flow rate controller 20 limits the flow rate passing to line 22 to a constant rate of flow and thus the surges are diverted to line 21. This again results in equipment and operation savings by having the reboiling apparatus designed and sized for a constant rate of flow.

The recombined streams in the accumulator 30 are then recycled by a pump 32 back through line 5 to be recycled through the process. While the stabilizer 23 may be omitted if desired, it has been found that the stabilizer combines and mixes the two stream portions it receives from lines 25 and 21 to prevent foaming in the accumulator 30 so as to provide a solid liquid column to the glycol pump 32 as foaming will cause malfunctioning of the pump.

However, as previously mentioned, the solution in line 14 may contain 2 to 15% of hydrocarbon condensate 33 which will accumulate on top of the glycol solution 34 in the accumulator 30. Since the condensate may be 15% of the flow, if the circulation rate of glycol is 200 gallons per hour, the rate of hydrocarbon condensate flowing into the accumulator 30 may be approximately 30 gallons per hour minus the volume lost to vaporization. The best place for transferring this condensate would be back in the natural gas processing cycle, but this should not be done by excluding the recycling of the glycol to the natural gas stream. Therefore, suitable means are provided to remove a portion of the condensate 33 along with a portion of the glycol solution 34 in the return line 5.

Thus, a first baffle 35 may be provided in the accumulator 30 to divide the accumulator into first and second sections 36 and 38. The baffle 35 does not extend entirely across the accumulator 30 but provides a fluid passageway 39 below the bottom of the baffle 35 for the passage of the glycol solution 34 and a fluid passageway 40 above the baffle 35 for the passageway of condensate 33. A second baffle 41 is provided extending upwardly from the bottom of the accumulator 30 but terminating at a point below the top of the baffle 35. An outlet tube 42 extends up into the accumulator 30 for drawing off fluids from the compartment 38. A retaining baffle 43 may be provided in the compartment 38 for retaining condensate above the tube 42 and yet providing a surge tank or storage for the glycol solution in the compartment 38 in the event of a lessening of flow into the accumulator 30. Thus, the condensate 33 which floats on the glycol solution 34 will flow over the top of the baffle 35 and baffle 41 to a position above the top of the tube 42. The glycol solution will flow by hydraulic action through the passageway 39 and over the top of baffle 41 to the top of the tube 42. Thus, regardless of the ratio of the condensate to the glycol solution 34 a portion of both fluids will flow to the top of tube 42 to be conducted by the pump 32 back into the return line 5 for recycling.

Of course, various modifications of the glycol regeneration system of the present invention may be used. FIGURES 2 and 3 illustrate modifications of the present invention still utilizing the divided glycol stream, the letters "a" and "b" being applied to the parts corresponding to those in FIGURE 1 for convenience of reference. Referring to FIGURE 2 as in FIGURE 1, the natural gas stream flows in line 1a, has the free water removed in the knockout 2a, is cooled by means of a heat exchanger 7a and cooler 9a and is conventionally separated in separator 11a. However, the flow diagram of FIGURE 2 is particularly useful where the solution in line 14a in addition to containing glycol and water includes an excess amount of hydrocarbon condensates. In this event, it is preferable to remove as much of this excess condensate as possible to avoid handling it in the glycol regeneration process. Thus, the solution in line 14a is passed through a heat exchanger 45 in the accumulator 30a thereby cooling the recombined solution in the accumulator 30a, and warming the solution from line 14a passing through the heat exchanger 45. The incoming solution is then passed from the heat exchanger 45 through a skimmer 46 such as one having a baffle 47 over which the condensate 48 flows and is removed from line 49 for further processing. The solution of glycol and water and a small amount of entrained condensate is flowed to the flow rate controller 20a, and as in FIGURE 1, divided into first stream portion 22a and second stream portion 21a with the first stream portion 22a being passed through the heat exchanger 26a, stripper 27a, glycol reboiler 24a, thereby being reconcentrated and passed through the stabilizer 23a through the line 25a. Again the hot regenerated glycol in the line 25a is mixed and recombined with the cold dilute glycol portion from line 21a in the stabilizer and passed through the accumulator 30a. The end product as in FIGURE 1 is a glycol solution of sufficient concentration, but cool enough so as not to require the additional refrigeration or cooling of the conventional system.

Referring now to FIGURE 3, the presently preferred embodiment of the present invention is best seen. Again a relatively cool solution of glycol, water and hydrocarbon condensate flows through 14b from a separator (not shown) for regeneration. The solution in line 14b passes through a heat exchanger 45b in the accumulator 30b. From the heat exchanger 45b, the solution, now preheated, passes through a filter 55. It is advantageous to place the filter downstream from the heat exchanger so that the viscosity of the solution is lowered and will not so likely clog or foul the filter. From the filter 55 a solution is passed through a pressure vessel 57. The pressure vessel 57 is divided into compartments 59 and 61 by a baffle 63 which has a passageway both above and below the baffle. The solution enters the pressure vessel at inlet 65 in compartment 61 and stratifies into a glycol-water strata 67 and a condensate strata 69. A first stream outlet 71 positioned in the strata 67 is positioned to withdraw primarily glycol and water from the pressure vessel 57. This first stream portion is arranged to flow at a constant rate through flow rate controller 20b. A second stream outlet 73 is provided in compartment 61 to conduct a solution of glycol, water and condensate from the pressure vessel 57.

The first stream portion flowing from the flow rate controller 20b is reconcentrated by flowing through a first heat exchanger 26b at the outlet of the stripper 27b and in series through a second heat exchanger 75 which condenses the steam leaving the stripper 27b further heating the first stream to recover lost heat. As in FIGURES 1 and 2 the first stream portion is passed through the stripper 27b and the glycol reboiler 24b and to the stabilizer 23b. In the meanwhile the cooler second stream portion flows through line 77 by the action of the back pressure valve 79 to the stabilizer 23b. The hot regenerated glycol then recombines with the cooler dilute glycol and the lighter hydrocarbons in the second stream are flashed off in the stabilizer 23b thereby preventing foaming of the recombined solution. The recombined solution flows to the accumulator 30b and is cooled by being in a heat exchange relationship with the heat exchanger 45b and the pressure vessel 57. Again as in FIGURES 1 and 2, means are provided for simultaneously removing both the condensate and the reconcentrated glycol from the accumulator. Thus, outlet pipe 42b extends into the accumulator 30b on the side of baffle 35b remote from the inlet to the accumulator to flow both the condensate and reconcentrated glycol back to line 5b. In this embodiment a separate surge tank is provided having a baffle 43b to store a supply of glycol in the separate surge tank 80 to insure that a sufficient supply of glycol is available.

In the operation, and again referring to FIGURE 1, the natural gas stream is passed from line 1, as the free water is removed in the knockout 2 and receives the glycol absorbent from line 5. The combined solution of the natural gas stream and the glycol absorbent is cooled in the heat exchanger 7 and the cooler 9 and is passed through the conventional separator 11. In the separator 11 the gas is removed through line 12 for further processing, and the major portion of the condensate is removed through line 13 for further processing. The remaining solution containing now for example approximately 65% glycol, 2 to 15% of hydrocarbon condensate with the remainder being water, all at about a temperature of approximately 0° F., is passed through the flow rate controller 20. In order to reduce the capital investment in the heating equipment and heating operation cost, only a first portion of the solution in line 14 is allowed to pass to the heating regeneration process through the flow controller 20 and into the line 22. This first stream portion passes through a heat exchanger 26 to cool the rising vapors from the stripper 27 and provide reflux liquid for the stripper and then passes through line 28 through a heat exchanger 29 in the accumulator 30. This heat exchanger serves to cool the recombined solution in the accumulator 30 thereby making the recombined solution more suitable for recycling and heats the first stream portion reducing the heating requirements in the heating process. From the heat exchanger 29 the first stream portion is passed through line 31 through the stripper 27 and into the reboiler 24 where it is boiled to partially remove the water absorbed by the glycol from the natural gas stream. The reboiler is normally operated at above 280° F. and will reconcentrate the glycol to a much higher concentration than required in line 5. The reconcentrated hot glycol passes from the reboiler to line 25 and is recombined with the cool dilute second stream portion from line 21. Stabilizer 23 may be used if desired to thoroughly mix and recombine the two streams to prevent foaming of the combined solutions. At this point in the process the recombined solution has a lower temperature, such as for example 120° F., and while diluted is still sufficiently reconcentrated for use with the natural gas stream. In addition, it must be mentioned that the flow rate controller 20 limits the flow rate into the line 22 to an optimum rate of flow so that the heating process need only be sized to heat the first stream portion, and need not be oversized to accommodate surges in the line 14 as the surges will be passed to the second stream portion 21.

As previously mentioned, the recombined solution in the accumulator 30 now includes the reconcentrated glycol 34 and hydrocarbon condensate 33. While it is desirable to reprocess the hydrocarbon condensate 33 thereby removing it from the regeneration system, this removal must not be at the expense of recycling the glycol. Therefore, a portion of both the glycol solution 34 and the hydrocarbon condensate 33 is flowed over the baffles 35 and 41 and above the outlet pipe 42 for recirculation by the pump 32 through the return line 5. Thus, the returned hydrocarbon condensate may be reprocessed and removed while the glycol reconcentrated solution 34 is available for recycling. It is to be noted that the glycol solution leaving the accumulator 30 is at a low temperature, for example approximately 80° to 100° F., thereby eliminating the requirement for additional cooling as compared with the conventional regeneration system, but is reconcentrated to approximately 70 to 80% concentration for satisfactory use.

Generally, the operation of the gas drying system of FIGURE 2 is similar to that of FIGURE 1. However, FIGURE 2 is particularly suitable when the solution leaving the separator 11a and line 14a contains an excess amount of hydrocarbon condensates. In this event the solution in 14a will pass through a heat exchanger 45 heating this solution where it is then passed through a skimmer 46 for removing the excess condensate through line 49 for further reprocessing. The dilute glycol and water solution is flowed to the flow rate controller 20a where similar to FIGURE 1 the stream is divided into two portions with the one portion in line 22a being reboiled and highly concentrated and thereafter being combined with the dilute cooled portion in line 21a for further recycling.

Referring now to FIGURE 3, the preferred embodiment is shown in which the dilute cool solution in line 14b flows through heat exchanger 45b, filter 55, and is stratified in vessel 57. The solution is again divided into two portions. However, the first portion flowing through outlet 71 consists of glycol and water which passes through flow rate controller 20b is heated in heat exchanger 26b and is further heated in heat exchanger 75 after which it passes to the stripper 27b and is boiled in reboiler 24b. The second fluid portion flowing from the pressure vessel 57 through outlet 73 includes condensate as well as glycol and water. The first and second stream portions are mixed in the stabilizer 23b where the lighter hydrocarbons are flashed off thereby preventing foaming of the combined solution. The hot regenerated glycol and the relatively cooler dilute glycol passes to the accumulator 30b where the recombined solution is further cooled from the heat exchanger 45b and the pressure vessel 57. The recombined solution flows out outlet pipe 42b and to return pipe 5b whereby the glycol is recycled and the condensate is reprocessed.

It is believed that the method of the present invention is apparent from the foregoing description of apparatus of the invention. The method, however, comprehends reconcentrating a relatively cool solution of liquid absorbent and liquid solute by dividing the cool solution into first and second portions, heating only the first portion sufficiently to obtain a highly concentrated absorbent whereby the heating process is required to be sized to process only the first portion, and recombining the hot reconcentrated first portion and the relatively cool dilute second portion to provide an absorbent that is cooler than the hot regenerated first portion but is richer in absorbent than the second portion. The method further comprehends limiting the rate of flow of the first portion thereby eliminating the need for the heating process to be sized to process surges in the flow of the solution. The method further comprehends the step of recombining and mixing the regenerated hot first portion with the cool dilute second portion thoroughly to flash off any lighter hydrocarbons to prevent foaming of the recombined mixture. In addition, the method includes processing a gas having an entrained condensate and solute by mixing with the gas a liquid absorbent, separating the solution of absorbent and solute including some condensate from the gas, dividing the solution into two portions, heating the first portion thereby vaporizing a portion of the solute and reconcentrating the absorbent, recombining the hot regenerated first portion and the relatively cool dilute second portion and recycling the combined solution which includes condensate and reprocess the condensate.

The present invention, therefore, is well adapted to carry out the objects and attain the ends and advantages mentioned as well as others inherent therein. While presently preferred embodiments of the invention are given for the purpose of disclosure, numerous changes in the details of construction, arrangement of parts, and steps of the process can be made which will readily suggest themselves to those skilled in the art and which are encompassed within the spirit of the invention and the scope of the appended claims.

What is claimed is:
1. The process of reconcentrating a relatively cool solution of glycol, water and hydrocarbon condensate comprising the steps of,
 dividing the solution into first and second portions, said first portion consisting primarily of glycol and water,
 limiting the said first portion to a substantially constant volume,
 boiling the first portion to reconcentrate the glycol by partially boiling off the water,
 recombining the first portion of hot reconcentrated glycol with the cooler second portion which includes glycol, water and condensate to flash off the lighter hydrocarbons in the condensate in the second portion thereby preventing foaming of the recombined solution, and
 passing the recombined first and second portions in a heat exchange relationship with the cool solution at a point prior to dividing the solution.
2. The process of claim 1 wherein,
 the first divided portion is boiled thereby providing a reconcentrated solution containing about 90 to 95% glycol, and wherein the recombined first and second portions provide a substantially cool solution having about 70 to 80% glycol.

3. The process of claim 1 wherein the recombined first and second portions provide a solution that is cooler than about 100° F.

4. The process of claim 1 wherein,
the first divided portion is boiled thereby providing a reconcentrated solution containing about 90 to 95% glycol, and
wherein the recombined first and second divided portions provide a solution containing about 70 to 80% concentration glycol and is cooler than about 100° F.

5. An apparatus for reconcentration of glycol in a cool solution containing glycol, water, and hydrocarbon condensate comprising,
a heat exchanger for receiving the cool solution,
a pressure vessel downstream and in series with the heat exchanger,
a baffle dividing said vessel into two compartments and having a passageway above and below said baffle,
said pressure vessel receiving said solution in one of the compartments and stratifying said solution,
means in the second compartment for withdrawing glycol and water,
means in the first compartment for withdrawing glycol, water and hydrocarbon condensate,
a flow rate control means in communication with the withdrawing means in the second compartment for limiting the rate of flow in said means,
pressure regulating means in communication with the withdrawing means in the first compartment,
a glycol reboiler in communication with the flow rate control means for receiving and reconcentrating the glycol withdrawn from the second compartment,
a stabilizer receiving the hot reconcentrated glycol from the reboiler and receiving the fluid withdrawn from the first compartment thereby partially flashing the lighter hydrocarbons in the fluid received from the first compartment, and recombining the fluids received,
an accumulator for receiving the recombined fluids from the stabilizer and in heat exchange relationship with the heat exchanger and the pressure vessel,
means for simultaneously removing both the condensate and the reconcentrated glycol from the accumulator.

References Cited
UNITED STATES PATENTS

| | | | |
|---|---|---|---|
| 2,690,814 | 10/1954 | Reid | 55—32 |
| 2,798,570 | 7/1957 | Kelley | 55—32 |
| 3,105,748 | 10/1963 | Stahl | 55—32 |

REUBEN FRIEDMAN, *Primary Examiner.*

C. HART, *Assistant Examiner.*